June 13, 1967 R. D. MILLS 3,324,675
AIRCRAFT AIR CONDITIONING SYSTEMS
Filed Oct. 20, 1965 5 Sheets-Sheet 1

INVENTOR.
ROBERT D. MILLS
BY
ATTORNEY

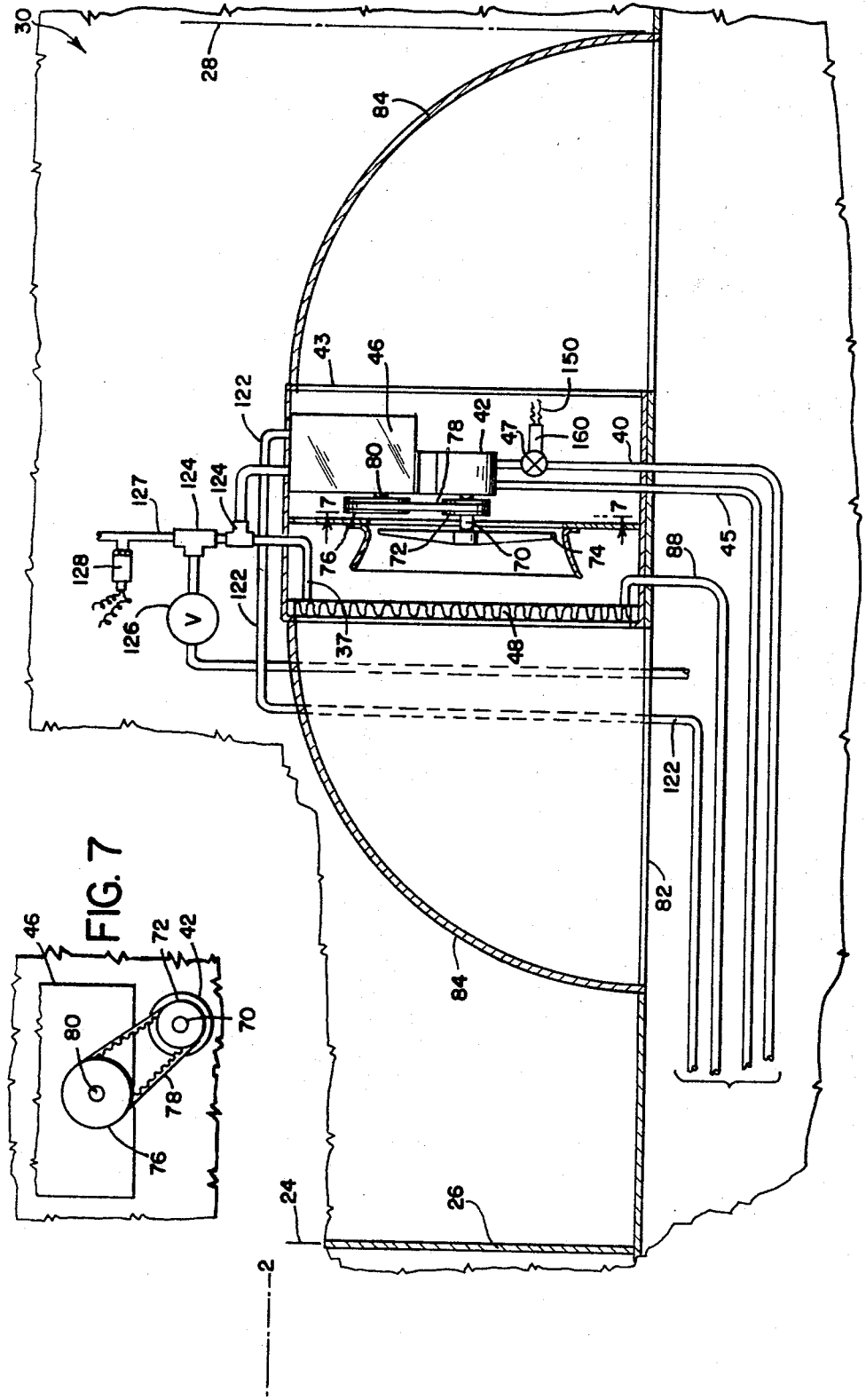

3,324,675
Patented June 13, 1967

1

3,324,675
AIRCRAFT AIR CONDITIONING SYSTEMS
Robert Dennis Mills, Minneapolis, Minn., assignor to Litton Systems, Inc., Beverly Hills, Calif.
Filed Oct. 20, 1965, Ser. No. 498,414
5 Claims. (Cl. 62—239)

This invention relates to aircraft air conditioning systems and more particularly to an economical, light-weight, high performance system for conditioning cabin air in an aircraft, and particularly in light aircraft.

Light or private aircraft, as distinguished from military and commercial aircraft, have been used for many years for business and pleasure purposes. Such light aircraft may carry one to nine passengers over ranges in the hundreds of miles. In general, light aircraft have a relatively limited payload carrying capability and have proven to be a reliable and safe means of transportation.

Over the years, customer demands for increased performance and comfort levels for such light aircraft has prompted investigation of systems for conditioning cabin air prior to, during and after flight of the aircraft. Despite such customer demands and investigation over a number of years, the provision of a satisfactory system for conditioning cabin air has remained a problem. In particular, systems developed with lightness of weight in mind have not been economical to purchase or operate. On the other hand, less expensive systems have been suggested using the aircraft electrical system as a source of power for the air conditioning system. However, such electrically powered systems were unsatisfactory because they consumed too much electrical power and overloaded the electrical system of the aircraft.

An added consideration in the development of air conditioning systems for light aircraft is the sensitivity of flight performance and stability to the location of the center of gravity of the aircraft. As an example, the center of gravity of a twin engine, private aircraft now sold in the United States may vary (according to the passenger and baggage loading thereof) within a range of forward and aft limits of only approximately 10 inches. To maintain flexibility in loading the aircraft, fixed equipment in the aircraft must be located so that at least the 10 inch range of center of gravity is maintained.

As another example, an aircraft accident report published in Aviation Week and Space Technology on February 8, 1965, indicated that improper loading of baggage at the tail of an aircraft caused the center of gravity of the aircraft to be located at the aft limit of center of gravity location. Because of the improper loading, when the landing gear was retracted the center of gravity of the aircraft moved approximately eight inches. The aircraft stalled and crashed because the eight inch movement of the center of gravity could not be compensated for by operation of the control surfaces.

To avoid problems such as those disclosed in the foregoing report, care must be taken not only in baggage loading but in locating aircraft equipment relative to the center of gravity of aircraft. However, because of a space limitation, it is often difficult to locate standard equipment on the aircraft in a desired location relative to the center of gravity.

Research conducted in an endeavor to provide a lightweight, economical, and high performance system for conditioning cabin air of a light aircraft indicates that the hydraulic system of such aircraft may be effectively utilized to power an air conditioning compressor unit. In addition, such research indicates that selective grouping of components of an air conditioning system and location of groups of components in the light aircraft results in high system performance and compatibility with aircraft attitude and center of gravity considerations. Moreover, air conditioning system safety may be achieved while the capability of conditioning cabin air is maintained even under compressor overload situations when the hydraulic pressure supplied to the compressor by the aircraft hydraulic supply facilities is limited.

An object of the present invention is to provide a new and improved aircraft air conditioning system.

Another object of the present invention resides in a light-weight, economical system for conditioning cabin air in a light aircraft.

Still another object of the present invention resides in the provision of an air conditioning system carried by an aircraft having a supply of pressurized hydraulic fluid wherein fluid from the supply is utilized to operate a compressor of the air conditioning system.

Yet another object of the present invention resides in the provision of an evaporator unit of an air conditioning system mounted at a selected point on an aircraft relative to the center of gravity wherein a refrigerant reservoir is included in such evaporator unit.

A further object of the present invention is to provide in an aircraft air conditioning system, unitary facilities for cooling liquid refrigerant and adjusting the relative humidity of cabin air wherein such facilities do not adversely effect the center of gravity of the aircraft.

A still further object of the present invention resides in the provision of a positive drive between a hydraulic motor and a compressor of an aircraft air conditioning system.

With these and other objects in mind, the present invention contemplates a system for conditioning cabin air of a light aircraft having a center of gravity located at a given position within a limited center of gravity range when the aircraft is in a normal, unloaded condition prior to passenger and baggage loading. A suitable aircraft may include facilities for supplying pressurized hydraulic fluid which drives a compressor which is mounted in the aircraft for compressing a refrigerant. Mounted in the aircraft on one side of the aircraft center of gravity and spaced from the compressor is a hollow housing defining a closed air flow path from a first location in the cabin to a second location in the cabin. An evaporator is mounted in the flow path for cooling air flowing in the flow path. A reservoir is mounted in the flow path downstream from the evaporator for cooling refrigerant from the compressor and supplying the cooled refrigerant to the evaporator. In an aircraft where the compressor must be mounted a considerable distance aft of the center of gravity, and weight must be located forward of the center of gravity to balance the weight of the compressor, the evaporator unit may be located forward of the center of gravity. Because the reservoir is located in the evaporator unit, the weight of the air conditioning system is balanced more evenly between the compressor and the evaporator unit, hence the air conditioning system is not likely to decrease the center of gravity range.

Also, even in situations wherein the evaporator unit and the compressor are mounted on the same side of the center of gravity, the more even balance between the weights of the two units provides more flexibility in the installation of the air conditioning system.

Other objects and advantages of the present invention will become apparent from the following detailed description when considered in conjunction with the accompanying drawings wherein:

FIG. 1 is a side view of a light aircraft provided with an air conditioning system according to the principles of the present invention;

FIGS. 2A and 2B, when joined along line 2—2 which is shown in both figures, form a schematic diagram showing hydraulic and refrigerant lines of the air conditioning system shown in FIG. 1;

FIG. 7 is a sectional view taken in elevation along line 7—7 in FIG. 2B showing a timing belt for positively driving a compressor of the air conditioning system.

Figure 1:
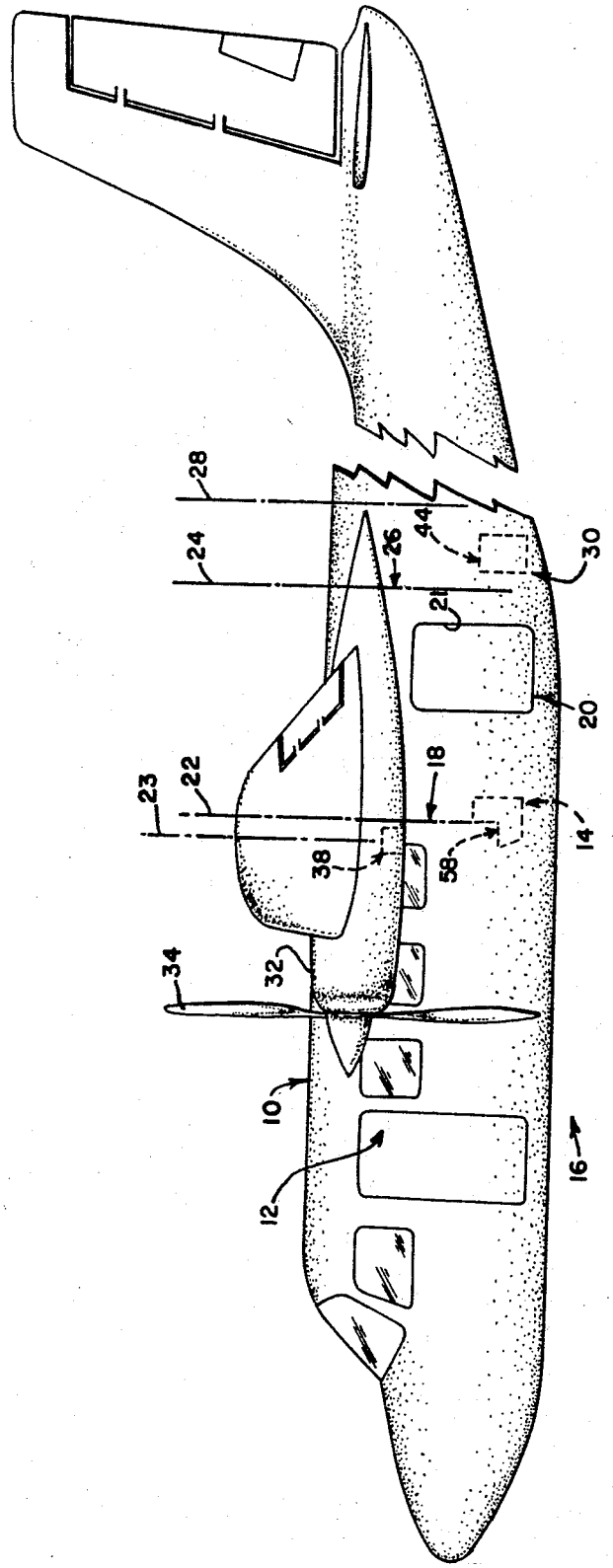

Referring now to the drawings, there is shown in FIGURE 1 a light aircraft 10 having a cabin 12 which may be air conditioned by an air conditioning system 14 of the present invention. The cabin 12 is relatively closed from the air 16 surrounding the aircraft 10 to permit the air in the cabin 12 to be maintained in a controlled condition of temperature and relative humidity. A wall 18 separates the cabin 12 from a first compartment 20, such as a baggage compartment, which is provided with an access door 21. The baggage compartment is located between stations 22 and 24 of the aircraft 10. The stations 22 and 24 are aft from the cabin 12. A second wall 26 separates the baggage compartment 20 from a second compartment 30 which is located between stations 24 and 28 located aft from the baggage compartment 20.

To describe the present invention, it will be assumed that when the aircraft 10 is in its normal, unloaded condition without passengers and/or baggage loaded therein, the center of gravity of the aircraft 10 is located at approximately station 23. With the unloaded center of gravity located at station 23, the aircraft 10 will have stable flight characteristics if the baggage and passenger loading of the aircraft 10 is such that the loaded center of gravity is within a certain limited range of distance forward and aft from the station 23.

To maintain the center of gravity range as large as possible, it is important that equipment, such as air conditioning equipment, be installed in the aircraft so as to avoid shifting the unloaded center of gravity from station 23.

Figure 2A:
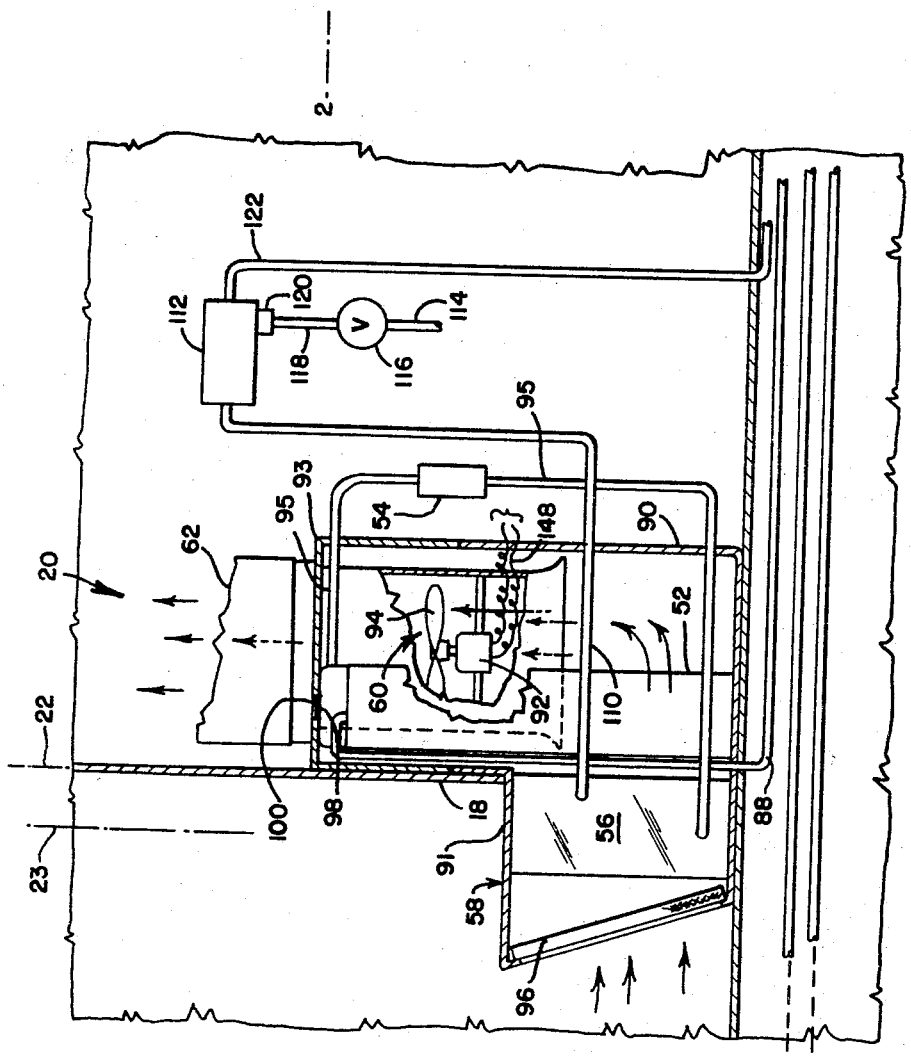
Figure 2A:
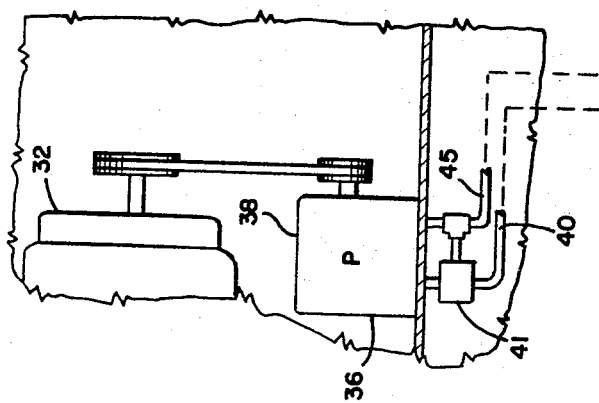
Figure 6:
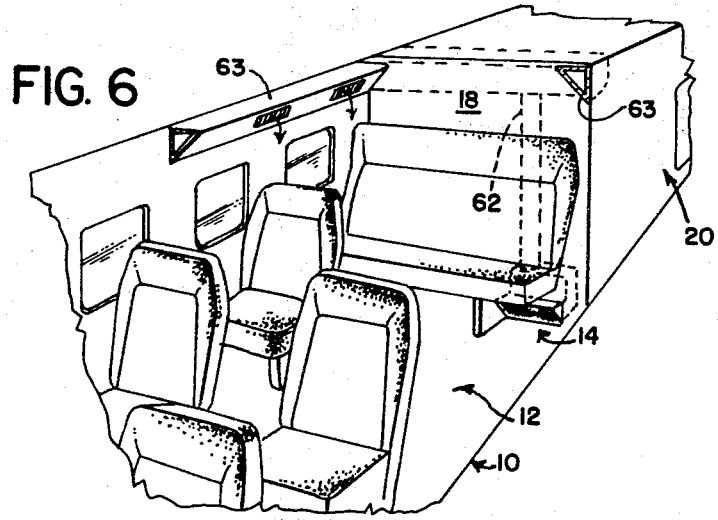
FIG. 6 is a schematic view of the cabin of the aircraft showing the evaporator unit drawing cabin air from the cabin and discharging cooled cabin air into the cabin through ductwork provided in the cabin.

Referring to FIG. 1 and to FIGS. 2A and 2B, a power plant, such as a jet aircraft engine, may be provided. On the aircraft 10 shown in FIG. 1, a power plant in the form of a piston engine 32 is shown adapted to drive a propeller 34 and a pump 36 of a hydraulic system 38 which supplies hydraulic fluid under pressure exceeding 1000 p.s.i., for example. A hydraulic line 40 connects the pump 36 to a fluid motor 42 mounted in a housing 43 of a condenser unit 44 of the air conditioning system 14. The condenser unit 44 is mounted in the second compartment 30 between stations 24 and 28. The motor 42 drives a compressor 46 of the condenser unit 44 for supplying refrigerant to a condenser 48. The refrigerant from the condenser 48 flows forward in the aircraft 10 through a reservoir or receiver 52 located adjacent station 23 and through an expansion valve 54 (shown in FIG. 2A) to an evaporator coil 56. The evaporator coil 56 is mounted in an evaporator unit 58 which extends through the wall 18 into the cabin 12. An evaporator fan 60 draws cabin air from the cabin 12 through the evaporator unit 58, past the evaporator coil 56 and past the reservoir 52 for return through a duct 62 and ducts 63—63 (FIG. 6) to the cabin 12. The evaporator coil 56 cools the cabin air which in turn cools the refrigerant in the reservoir 52. The heat transfer from the reservoir 52 to the cooled cabin air adjusts the relative humidity of the cooled cabin air in the ducts 62 and 63—63 to a level which will achieve a comfortable relative humidity in the cabin 12.

In an aircraft in which the center of gravity is located aft of the cabin 12, and in which the evaporator unit 58 is mounted adjacent the cabin, the location of the relatively heavy reservoir 52 in the evaporator unit permits flexibility in the location of the condenser unit 44 in one of the aft compartments of the aircraft.

Attention is now directed to FIGS. 2A and 2B where the air conditioning system 14 is shown in detail. The hydraulic pump 36 is driven at a speed which varies according to the speed of the engine 32. At an engine speed of approximately a fast idle, the pump 36 develops a pressure of approximately 1000 p.s.i. and provides 5.5 g.p.m., for example, of pressurized fluid in the line 40. When the back pressure in the line 40 exceeds 1000 p.s.i., a pressure responsive by-pass valve 41 opens and diverts hydraulic fluid to a return line 45 so that the pressure in line 40 is limited to 1000 p.s.i. The line 40 is connected to the motor 42 which is mounted in the condenser unit housing 43. An on-off solenoid valve 47 controlled by the circuit shown in FIG. 3 in the line 40 controls the flow of hydraulic fluid to the motor 42. When the valve 47 is opened, pressurized hydraulic fluid is supplied to the motor 42. At a pressure of 1000 p.s.i. and a hydraulic fluid flow rate of approximately 5.5 g.p.m., the fluid motor 42 will be rotated or driven at an operating speed 3500 r.p.m. As shown in FIG. 7, the fluid motor 42 drives a shaft 70 to which is keyed a first timing pulley 72 and a fan 74. The first timing pulley 72 drives a second timing pulley 76 through a timing belt 78 to provide a positive, non-slip drive for the compressor 46 which is driven by a shaft 80 to which is keyed the second timing pulley 76. The compressor 46 receives refrigerant, such as Freon–12, as a slightly superheated vapor and compresses it to a completely superheated vapor state.

The fan 74 draws ambient air through a grill 82 in the aircraft 10 and into a duct 84 which directs the ambient air across the condenser 48 at a rate of 1100 c.f.m., for example. The condenser 48 transfers heat to the ambient air so that the refrigerant pumped from the compressor 46 to the condenser 48 in the superheated vapor state, condenses, and flows in the liquid state through a line 88 to the reservoir 52.

As shown in FIGS. 2A and 2B, the condenser unit 44 is mounted in the second compartment 30 where adequate room is provided for the duct 84 and the compressor unit housing 43. In installations where weight is not a factor, the reservoir 52 would normally be mounted within the compressor unit housing 43. Also, in such installations, it is common to provide a separate facility for varying the temperature of the cooled cabin air which is discharged into the cabin 12.

In accordance with the present invention, and in view of weight considerations and the desired location of the center of gravity of the aircraft 10 at the station 23, the reservoir 52 is located in a hollow housing or chamber 90 of the evaporator unit 58. In this location, the reservoir 52 is adjacent to, such as within a few inches of, station 23, hence, is very close to the center of gravity of the aircraft 10. Because the weight of the reservoir 52 may be as high as 10 percent of the weight of the condenser unit 44 and as much as 7 percent of the combined weight of the evaporator unit 58 and the condenser unit 44, the location of the reservoir 52 is critical to the location of the center of gravity and, hence, to the stability of the flight characteristics of the aircraft 10.

Figure 5:
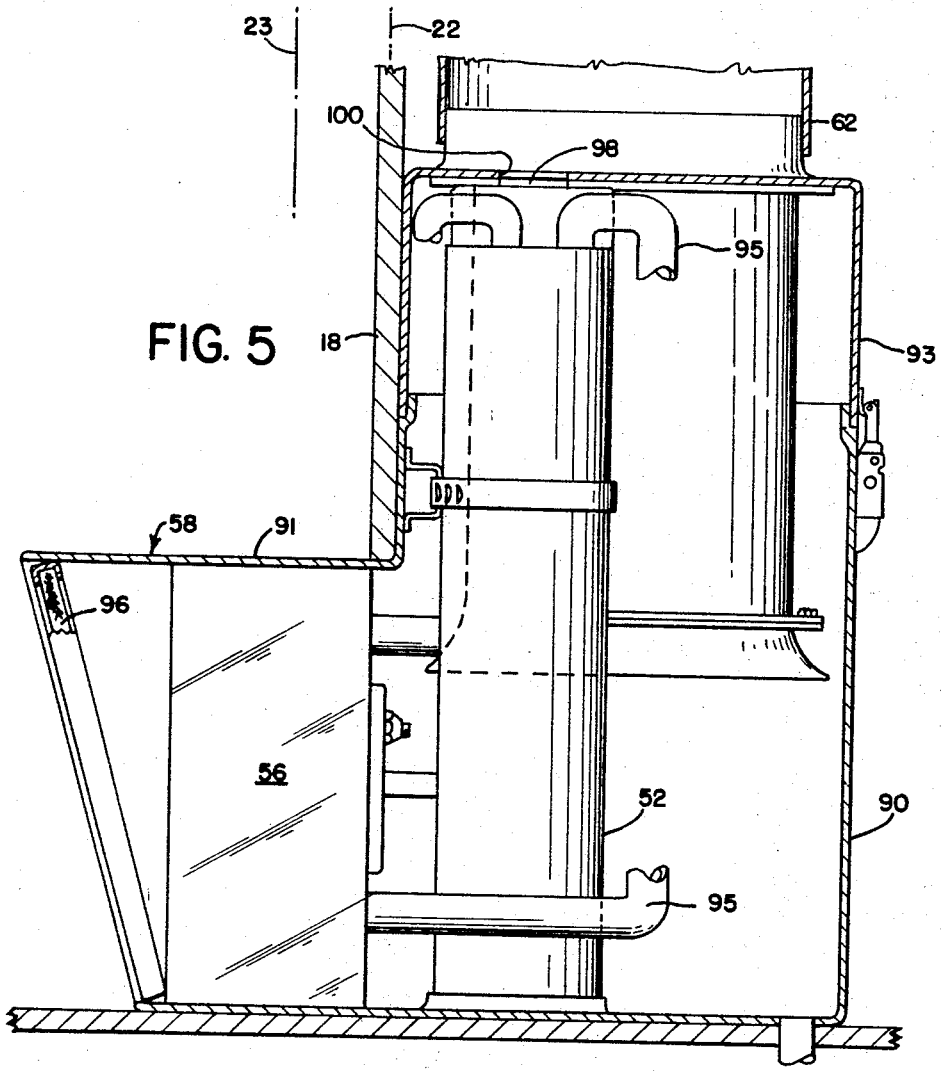
FIG. 5 is an elevational view taken in section along line 5—5 of FIG. 4 showing the receiver mounted in a hollow housing through which cooled cabin air flows.

As shown in detail in FIGS. 2A and 5, a hollow section 91 of the hollow housing 90 extends or projects forward through the wall 18 into the cabin 12. The housing 90, including the section 91, defines a closed air flow path from the cabin 12 through the evaporator unit 58 to the cabin.

The evaporator fan 60 is mounted in an upwardly extending portion 93 of the housing 90 and includes an electric motor 92 which is connected to the electrical system (see FIG. 3) of the aircraft 10. The motor 92 rotates a fan blade 94 which draws warm cabin air from the cabin 12 through a filter 96 mounted in the forward section 91 of the housing 90 for removing particulate material from the cabin air. The cabin air is drawn through the hollow housing 90 where it is cooled and is blown into the ducts 62 and 63—63 for return to the cabin 12.

The evaporator coil 56 is mounted in the air flow path defined by the hollow section 91 of the housing 90. The evaporator coil 56 is connected by a line 95 to the expansion valve 54 which receives cooled refrigerant from the reservoir 52. Heat from the cabin air in the air flow path is transferred to the cooled refrigerant flowing through the evaporator coil 56 so that the cabin air is cooled.

The cooled cabin air flows in the housing 90 past the reservoir 52. The line 88 connects the condenser 48 to the reservoir which is cylindrical in shape. Because the section 91 of the housing 90 projects into the cabin 12 and receives the evaporator coil 56, the reservoir may be mounted forward in the portion 93 of the housing 90 directly in the flow path of the cooled cabin air to permit the cooling of the refrigerant in the reservoir 52. Also, the projection of the section 91 permits the evaporator coil 56 and the reservoir 52 to be mounted adjacent to the center of gravity 23.

The top of the reservoir 52 is provided with a sight glass 98 which projects upwardly from the reservoir to an aperture 100 in the hollow housing 90 to permit observation of the refrigerant. Normally, when the amount of refrigerant in the air conditioning system 14 is adequate, refrigerant will fill the sight glass 98 and no bubbles will be visible. However, when the refrigerant level is low, bubbles will appear when one looks into the reservoir 52 through the sight glass 98. Because the sight glass 98 projects upwardly to the aperture 100 toward the baggage compartment 20, easy observation of the refrigerant level is afforded to maintenance personnel.

As noted, because the reservoir 52 is mounted in the flow path of the cooled cabin air, heat is transferred from the reservoir 52 to the cooled cabin air which flows in the housing 90 toward the evaporator fan 60. In this manner, the refrigerant is cooled prior to flowing into the evaporator coil 56. Also, the temperature of the cooled cabin air is raised to adjust the relative humidity of the cooled cabin air so that upon mixture of the cooled cabin air with the air in the cabin 12, a comfortable level of relative humidity is achieved.

The heated refrigerant from the evaporator coil 56 flows through a line 110 to a standard suction throttling valve 112 which maintains the pressure within the evaporator coil 56 efficiently high to prevent freezing of moisture on the evaporator coil 56 and at the same time provides maximum cooling efficiency. A refrigerant supply line 114 is connected to a normally closed valve 116 connected to a line 118. The line 118 is coupled to a coupling 120 provided on the suction throttling valve 112 for introducing refrigerant to the air conditioning system 14.

A line 122 connects the suction throttling valve 112 to the compressor 46. A pair of T connections 124—124 apply refrigerant pressure to a safety pressure valve 126 and to a line 127 connected to a pressure responsive switch 128 (see also FIG. 3). If the refrigerant pressure exceeds a specified amount, such as 500 p.s.i., the valve 126 opens and releases refrigerant from the system 14. Similarly, the switch 128 responds to excessive refrigerant pressure and opens an electrical circuit 150 in the electrical diagram shown in FIG. 3.

Figure 3:
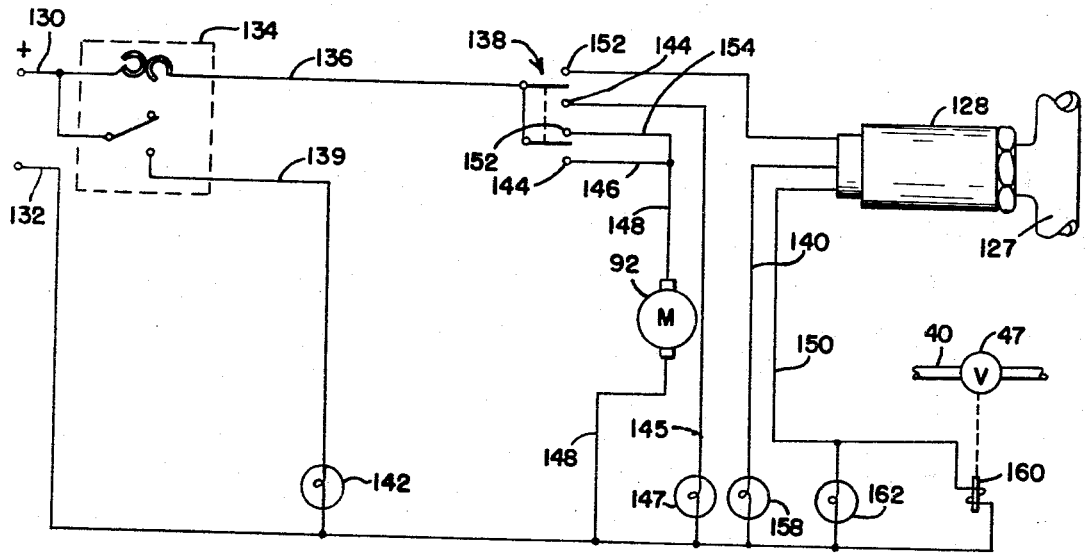
FIG. 3 is a schematic diagram of an electrical circuit which cooperates with the hydraulic and refrigerant lines shown in FIGS. 2A and 2B for controlling the air conditioning system of the present invention.
Figure 4:
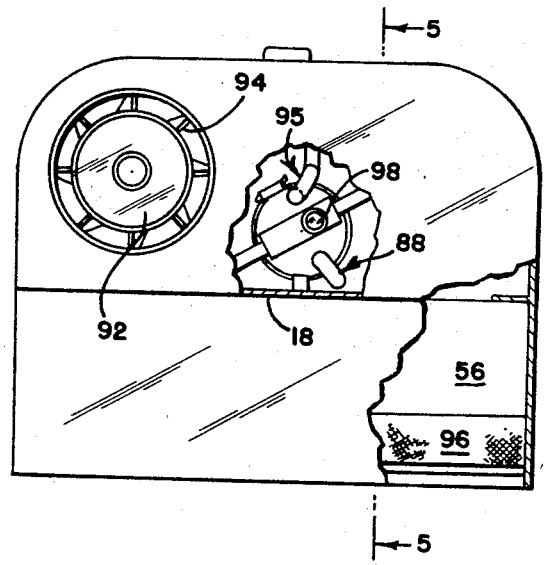
FIG. 4 is a plan view of an evaporator unit showing a sight glass of a refrigerant receiver which may be viewed upon opening a door to a baggage compartment of the aircraft for determining if sufficient refrigerant is in the air conditioning system.

Referring to FIG. 3 and to the other figures, the operation of the air conditioning system 14 will be apparent. Terminals 130 and 132 are connected to the electrical system of the aircraft 10. A circuit breaker 134 normally closes a circuit 136 and connects the terminal 130 to a double pole, double throw switch 138. However, when an unsafe electrical conditions exists, the circuit breaker 134 opens to open the circuit 136, and closes a circuit 139 which lights a warning lamp 142.

With the circuit 136 closed, the pilot may close the switch 138 to connect power to contacts 144—144, to complete circuits 146 and 148. The evaporator unit motor 92 is connected in the circuit 148 for circulating cabin air. Because the circuit 148 may be completed independently from completion of a circuit 150 which controls operation of the motor 42, the cabin air may be circulated without operating the compressor 46. In this situation, a circuit 145 is completed through a "Fan-Only" lamp 147 to indicate operation of the fan 60 independently of the motor 12.

The switch 138 may also be positioned to connect the circuit 136 to contacts 152—152. The contacts 152—152 are connected to a circuit 154 which is connected to the circuit 148 for operating the motor 92 which is effective to circulate cabin air through the housing 90. Completion of the circuit 136 to the contacts 152—152 also completes the circuit 150 through the pressure responsive switch 128 (FIG. 2B). According to the pressure in the refrigerant line 122, the switch 138 either completes the circuit 150 or a circuit 140. If excessive pressure exists in line 122, the circuit 140 is closed and circuit 150 opened so that a warning lamp 158 is lighted. Normally circuit 150 is closed and supplies electrical power to a coil 160 of the solenoid valve 47 to permit hydraulic fluid to flow to the motor 42. In this situation, an "AIR CONDITIONING ON" lamp 162 is lighted to indicate proper operation of the air conditioning system 14.

With the engine 32 operating at a fast idling speed, the pump 36 delivers 5.5 g.m.p., for example, of hydraulic fluid at 1000 p.s.i. to the line 40 and through the now open solenoid valve 47 to the motor 42. The motor 42 is rotated and drives the fan 74 which draws 1100 c.f.m., for example of ambient air across the condenser 48 to transfer 20,000 B.t.u./hr. (at a 100° F. ambient air temperature, for example) to the ambient air.

The motor 42 also drives the compressor 46 which supplies superheated vapor refrigerant to the condenser 48 where the heat transfer from the condenser to the ambient air condenses the refrigerant to the liquid state. With normal compressor loading, the by-pass valve 41 (FIG. 2A) will not be actuated to divert hydraulic fluid to the return line 45. If the compressor 46 is overloaded causing the motor 42 to be overloaded and the back pressure in the line 40 to tend to exceed 1000 p.s.i., the by-pass valve 41 precludes the pressure from exceeding 1000 p.s.i. so that the fluid pressure to the motor 42 is limited without being cut off. Thus, the motor 42 operates at a safe pressure and the cabin air continues to be cooled.

The liquid refrigerant flows in line 88 to the receiver 52 where it is cooled by cooled cabin air flowing from the section 91 into the portion 93 of the housing 90. The cooled refrigerant flows into the expansion valve 54 and then into the evaporator coil 56. With the fan blade 94 drawing 300 c.f.m. of cabin air across the evaporator coil 56 at an evaporating temperature of 35° F., for example, 15,000 B.t.u./hr. is transferred from the cabin air to the refrigerant. The refrigerant flows through the line 110 to the suction valve 112 into the line 122 for return to the compressor 46.

If the pressure in the line 37 exceeds a desired pressure of 500 p.s.i., for example, the safety valve 126 opens and releases refrigerant from the line 37. Also, the pressure responsive switch 128 is actuated and opens the circuit 150. With the circuit 150 open, the solenoid coil 160 is deenergized and closes the valve 47 to block the flow of hydraulic fluid to the motor 42 and stop the cooling operation. The actuation of the switch 128 also closes the circuit 140 so that the warning lamp 158 is lighted to apprise the pilot that the cooling system is not operating.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In a system for conditioning cabin air of an aircraft having a center of gravity located at a given position when said aircraft is in a normal unloaded condition prior to installation of said air conditioning system, said aircraft including means for supplying pressurized hydraulic fluid, the combination with said supply means and said aircraft which comprises:
    compressor means driven by fluid from said fluid supply and mounted in said aircraft spaced from said center of gravity for compressing a refrigerant;
    hollow means mounted in said aircraft spaced from said compressor means for defining a closed air flow path from a first location in said cabin to a second location in said cabin;
    evaporator means mounted within said hollow means in said flow path for cooling air flowing in said flow path; and
    refrigerant reservoir means mounted in said flow path downstream from said evaporator means for cooling refrigerant from said compressor means and supplying said cooled refrigerant to said evaporator means, the location of said reservoir means within said hollow means being effective to shift said center of gravity from said given position by a limited amount.

2. In a system for conditioning cabin air of an aircraft having a center of gravity located at a given position when said aircraft is in a normal unloaded condition prior to installation of said air conditioning system, said aircraft including means for supplying pressurized hydraulic fluid, the combination with said supply means and said aircraft which comprises:
    compressor means driven by fluid from said fluid supply and mounted in said aircraft spaced from said center of gravity for compressing a refrigerant;
    hollow means mounted in said aircraft substantially between said compressor means and said center of gravity, said hollow means defining a closed air flow path from a first location in said cabin to a second location in said cabin;
    evaporator means mounted in said flow path for cooling air flowing in said flow path; and
    refrigerant reservoir means mounted in said flow path downstream from said evaporator means for cooling refrigerant from said compressor means and supplying said cooled refrigerant to said evaporator means, the location of said reservoir means in said flow path being effective to shift said center of gravity from said given position by a limited amount.

3. In a system for air conditioning a cabin of an aircraft having a first compartment located aft from said cabin and a second compartment located aft from said first compartment, said cabin and first compartment being separated by a wall, said aircraft including means for supplying pressurized fluid, the combination with said aircraft which comprises:
    means driven by said supply means for compressing a refrigerant, said compressing means being mounted in said second compartment for exposure to ambient air outside said cabin;
    a hollow housing mounted in said first compartment adjacent to said wall, said housing having a section extending through said wall into the cabin, said housing defining a flow path for air from a first location in said cabin to a second location in said cabin;
    reservoir means received in said hollow housing for receiving a supply of refrigerant from said compressing means; and
    evaporator means received in said section of said hollow housing and receiving refrigerant from said reservoir for cooling air from said cabin flowing in said flow path, said evaporator means being effective to pass said cooled cabin air across said reservoir to cool the refrigerant in said reservoir and to regulate the relative humidity in said cabin.

4. In a system for conditioning air in a cabin of a light aircraft having a center of gravity located at a given position when said aircraft is in a normal, unloaded condition prior to installation of said system, said aircraft including means for supplying pressurized hydraulic fluid, the combination with said supply means which comprises:
    compressor means mounted in said aircraft spaced from said center of gravity, said compressor means being driven by fluid from said fluid supply for compressing refrigerant;
    chamber means having an upwardly extending portion mounted in said aircraft between said compressor means and said center of gravity, said chamber means being provided with a section extending forward in said aircraft into said cabin for receiving air from said cabin and discharging said air into said upwardly extending portion;
    evaporator means mounted in said section of said chamber means for cooling said air from said cabin, said evaporator means being effective to return said cooled cabin air to said cabin; and
    refrigerant reservoir means mounted in said upwardly extending portion of said chamber means for cooling refrigerant from said compressor means and supplying it to said evaporator means, the loaction of said reservoir means in said portion being effective to shift said center of gravity from said given position by a limited amount.

5. In a system for conditioning air in a cabin of a light aircraft, said aircraft having a center of gravity located at a given position when said aircraft is in a normal, unloaded condition prior to installation of said system, said aircraft being provided with an aft compartment and a forward compartment between said aft compartment and said center of gravity of said aircraft, said aircraft including means for supplying pressurized hydraulic fluid, the combination with said aircraft which comprises:
    compressor means mounted in said aft compartment and being driven by pressurized hydraulic fluid from said supply for compressing a refrigerant;
    chamber means mounted in said forward compartment adjacent said center of gravity and having a section projecting into said cabin, said chamber means having a top surface provided with an aperture;
    fan means mounted in said chamber means for withdrawing air from said cabin into said chamber means;
    evaporator means including a coil mounted in said section for cooling air withdrawn from said cabin, said fan means being effective to move said cooled air through said chamber means for return to said cabin; and reservoir means for receiving a supply of refrigerant from said compressor means, said reservoir means being mounted in said chamber means and having a refrigerant sight glass projecting adjacent to aperture in said chamber means, said cooled air flowing in said chamber means being effective to cool the refrigerant in said reservoir means.

References Cited

UNITED STATES PATENTS

| | | | |
|---|---|---|---|
| 2,100,834 | 11/1937 | Chapman | 62—509 |
| 2,511,877 | 6/1950 | Protzeller | 62—239 |
| 2,938,686 | 5/1960 | Van Winkle | 62—239 |
| 2,941,373 | 6/1960 | Simmons | 62—239 |
| 3,003,331 | 10/1961 | Coburn | 62—239 |
| 3,082,609 | 3/1963 | Ryan | 62—239 |

WILLIAM J. WYE, *Primary Examiner.*